US006197898B1

(12) United States Patent
van den Berg et al.

(10) Patent No.: US 6,197,898 B1
(45) Date of Patent: Mar. 6, 2001

(54) MELT-MIXING THERMOPLASTIC AND EPOXY RESIN ABOVE TG OR TM OF THERMOPLASTIC WITH CURING AGENT

(75) Inventors: Eduard Aarts van den Berg, Woensdrecht (NL); Christian Maria Emile Bailly, Altamont, NY (US); Johannes Everardus Fortuyn, Bergen op Zoom (NL); Marinus Cornelis Adriaan van der Ree, Sint-Philipsland (NL); Robert Walter Venderbosch, Bergen op Zoom (NL); Frits Jan Viersen, Roosendaal (NL); Gerrit de Wit, Ossendrecht (NL); Hua Wang; Sadhan C. Jana, both of Niskayuna, NY (US); Andrew Jay Salem, Albany, NY (US); Joel Matthew Caraher, Delanson, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 08/972,491

(22) Filed: Nov. 18, 1997

(51) Int. Cl.[7] ............................. C08L 25/06; C08L 67/02; C08L 71/12; C08L 77/00
(52) U.S. Cl. ..................... 525/523; 264/240; 523/466; 523/467; 525/92 H; 525/107; 525/108; 525/109; 525/111; 525/113; 525/122; 525/423; 525/438; 525/454; 525/463; 525/471; 525/476; 525/485; 525/486
(58) Field of Search .......................... 525/396, 107, 525/108, 109, 111, 113, 122, 423, 438, 454, 463, 471, 485, 486, 500, 501, 92 H, 476; 264/240; 523/466, 467

(56) References Cited

U.S. PATENT DOCUMENTS

| 3,367,978 | 2/1968 | White . |
| 3,367,990 | 2/1968 | Bremmer . |
| 3,375,298 | 3/1968 | Fox . |
| 3,468,824 | 9/1969 | Williams . |
| 3,475,513 | 10/1969 | Benson . |
| 3,652,710 | 3/1972 | Holub . |
| 3,689,444 | 9/1972 | Gilbert . |
| 3,763,088 | 10/1973 | Izawa . |
| 3,812,214 | 5/1974 | Markovitz . |
| 4,137,275 | 1/1979 | Smith et al. . |
| 4,496,695 | 1/1985 | Sugio et al. . |
| 4,528,346 | 7/1985 | Sugie et al. . |
| 4,567,216 | 1/1986 | Qureshi et al. . |
| 4,579,992 | 4/1986 | Kaufhold et al. . |
| 4,608,404 | 8/1986 | Gardner et al. . |
| 4,623,558 | 11/1986 | Lin . |
| 4,661,559 | 4/1987 | Gardner et al . |
| 4,677,144 | 6/1987 | Yasuda et al. . |
| 4,695,745 | 9/1987 | Mimoto et al. . |

(List continued on next page.)

FOREIGN PATENT DOCUMENTS

| 260704 | 10/1988 | (DE) . |
| 3711757 | 10/1988 | (DE) . |
| 3931809 | 4/1990 | (DE) . |
| 3837647 | 5/1990 | (DE) . |
| 3912880 | 10/1990 | (DE) . |
| 436212 | 7/1991 | (EP) . |
| 557086 | 8/1993 | (EP) . |
| 592145 | 4/1994 | (EP) . |
| 50-15519 | 6/1975 | (JP) . |
| 54-156076 | 12/1979 | (JP) . |
| 56-106954 | 8/1981 | (JP) . |
| 56-30360 | 9/1982 | (JP) . |
| 58-69052 | 4/1983 | (JP) . |
| 58-87041 | 5/1983 | (JP) . |
| 58-98359 | 6/1983 | (JP) . |
| 58-219217 | 12/1983 | (JP) . |
| 58-225150 | 12/1983 | (JP) . |
| 59-213758 | 12/1984 | (JP) . |
| 60-248344 | 12/1985 | (JP) . |

(List continued on next page.)

OTHER PUBLICATIONS

CA 121:181031; Venderbosch et al., "Polymer blends . . . " Mar. 1993.*
Reactive processing of Thermoset/Thermosplastic Blends: A potential for Injection Molding by: Hiroaki Fujiwara, Bong Sup Kim and takashi Inoue.
Poly (2,6–Dimethyl–1,4–Phenylene Ether) (PPE) Redistribution and its significance in the preparation of PPE/Epoxy Laminate by: Herbert S.–I. Chao and Jana M. Walen.
The Equation of State Theory for Glass Transition Temperature in Miscible Polymer blends by: Ick Hwan kwon and Won Ho Jo.
The preparation of morphology of PPO–Epoxy Blends by: Raymond A. Pearson and Albert F. Yee.
Toughening mechanisms in thermoplastic–modified epoxies: 1. Modification using poly(phenylene oxide) by: Raymond A. Pearson and Albert F. Yee.
The effect of a styrene–methyl methacrylate block copolymer on the morphological, rheological and mechanical properties of poly (2,6–dimethyl–1,4–phenylene ether)(PPE) and poly(hydroxy ether of bisphenol A) (Phenoxy) blends.

(List continued on next page.)

Primary Examiner—Robert E. L. Sellers

(57) ABSTRACT

A process for preparing a polymer composition useful as a prepreg comprises (a) melt-mixing at least one thermoplastic polymer above the glass transition temperature or melt temperature of the thermoplastic polymer with either (i) an uncured epoxy resin or (ii) an epoxy curing agent or a catalyst; (b) melt-mixing above the glass transition temperature or melt temperature of the thermoplastic polymer, the other of (i) an uncured epoxy resin or (ii) an epoxy curing agent or a catalyst to form a substantially uncured but essentially curable and/or polymerizable composition; (c) optionally forming a shaped product from the melt-mixed composition of (b); and (d) fast-curing and/or fast-polymerizing the optionally formed shaped product.

21 Claims, 2 Drawing Sheets

U.S. PATENT DOCUMENTS

| | | |
|---|---|---|
| 4,757,117 | 7/1988 | Moss . |
| 4,760,106 | 7/1988 | Gardner et al. . |
| 4,853,423 | 8/1989 | Walles et al. . |
| 4,855,339 | 8/1989 | Saito et al. . |
| 4,912,172 * | 3/1990 | Hallgren et al. ............... 525/396 |
| 4,920,164 | 4/1990 | Sasaki et al. . |
| 4,975,319 | 12/1990 | Walles . |
| 5,001,010 | 3/1991 | Chao et al. . |
| 5,043,367 | 8/1991 | Hallgren et al. . |
| 5,073,605 | 12/1991 | Hallgren et al. . |
| 5,087,657 | 2/1992 | Qureshi et al. . |
| 5,089,343 | 2/1992 | Colborn et al. . |
| 5,096,771 | 3/1992 | Walles et al. . |
| 5,108,842 | 4/1992 | Hallgren . |
| 5,124,415 | 6/1992 | Sakamoto et al. . |
| 5,141,791 * | 8/1992 | Chao et al. ............... 428/209 |
| 5,162,450 | 11/1992 | Chao et al. . |
| 5,213,886 | 5/1993 | Chao et al. . |
| 5,250,228 | 10/1993 | Baigrie et al. . |
| 5,268,064 | 12/1993 | Woo et al. . |
| 5,302,645 | 4/1994 | Nakano et al. . |
| 5,310,825 * | 5/1994 | Babayan et al. ............... 525/423 |
| 5,317,067 * | 5/1994 | Yagi et al. ............... 525/396 |
| 5,352,745 | 10/1994 | Katayose et al. . |
| 5,382,384 | 1/1995 | Baigrie . |
| 5,413,847 * | 5/1995 | Kishi et al. ............... 428/283 |
| 5,473,118 | 12/1995 | Fukutake et al. . |
| 5,474,853 | 12/1995 | Watanabe et al. . |
| 5,478,599 | 12/1995 | Iyer et al. . |
| 5,519,177 * | 5/1996 | Wang et al. ............... 174/259 |
| 5,859,176 * | 1/1999 | Nakahashi et al. ............... 525/397 |
| 5,929,151 * | 7/1999 | De Wit et al. ............... 524/381 |

FOREIGN PATENT DOCUMENTS

| | | |
|---|---|---|
| 61-84244 | 4/1986 | (JP) . |
| 61-89371 | 5/1986 | (JP) . |
| 61-286130 | 6/1986 | (JP) . |
| 61-293260 | 12/1986 | (JP) . |
| 62-124146 | 6/1987 | (JP) . |
| 62-148564 | 7/1987 | (JP) . |
| 62-153349 | 7/1987 | (JP) . |
| 89-3223 | 1/1989 | (JP) . |
| 2-43234 | 2/1990 | (JP) . |
| 5-29761 * | 2/1993 | (JP) . |
| 6-1823 | 1/1994 | (JP) . |
| 62-6955 | 1/1994 | (JP) . |
| 6-32876 | 2/1994 | (JP) . |
| 6-200054 | 7/1994 | (JP) . |
| 6-211964 | 8/1994 | (JP) . |
| 8-12875 | 1/1996 | (JP) . |
| 9-31743 | 1/1997 | (JP) . |
| 7117397 | 12/1974 | (NL) . |
| 72-156259 | 6/1972 | (PL) . |
| 363720 | 5/1970 | (SU) . |
| 350806 | 2/1971 | (SU) . |
| 655708 | 4/1979 | (SU) . |

OTHER PUBLICATIONS

R.W. Venderbosch et al., Polymer Blends Based, Centre for Polymers and Composites, Eindhoven University of Tecnology.

R.W. Venderbosch et al., Processing of intractable polymers, POLYMER vol. 35 No. 20, 1994, 4349.

M.C.M. van der Sanden, II et al., The ultimate toughness of polymers., Progress in Colloid & Polym Sci 92:120–128 (1993).

R.W. Venderbosch et al., Processing of Intractable polymers using reactive solvents; POLYMER vol. 36, No. 6, 1995.

C. Li and R.A. Dickie, Bonding adhesive joints with radio–frequency dielectric heating, Int J Adhesion and Adhesives vol. 11 no> Oct. 4, 1991.

R.W. Venderbosch, J.G.L. Nelissen, A>A>J>M> Peijs, P.J. Lemstra, Adv. Compos. '93, Proc. Int. Conf. Adv. Compos, Mater, (1993) 837–842.

* cited by examiner

MELT-MIXING THERMOPLASTIC AND EPOXY RESIN ABOVE TG OR TM OF THERMOPLASTIC WITH CURING AGENT

FIELD OF THE INVENTION

The invention relates to a process for molding and shaping polymer blends comprising at least one thermoplastic polymers and an uncured thermosettable and/or polymerizable epoxy resin.

CROSS-REFERENCE TO RELATED APPLICATIONS

Not Applicable.

STATEMENT REGARDING FEDERALLY SPONSORED RESEARCH

Not applicable.

BACKGROUND OF THE INVENTION

The invention also relates to articles shaped out of a material comprising a thermoplastic phase in which cured or polymerized epoxy particles have been dispersed. Said articles can be obtained with the process of the invention Processes for the molding and shaping of polymer blends comprising thermoplastic polymers blended with epoxy resins are known. The advantages of said processes are related to the fact that some thermoplastic polymers are difficult to mold and shape in view of their high processing temperature. By blending the polymers with uncured or low molecular weight epoxy resins it becomes possible to shape the polymers at lower temperatures. To obtain shaped products with the good properties of the used thermoplastic polymers, it is necessary to separate the epoxy resin from the thermoplastic polymer after the shaping step to obtain a continuous matrix of the thermoplastic polymer(s) with dispersed epoxy particles. Processes to make products made from material with a continuous phase of cured epoxy resins in which thermoplastic particles have been dispersed are also known. In the latter case products are obtained with the material properties of the cured epoxy resin which has been adjusted somewhat by the dispersed particles of thermoplastic resin.

U.S. Pat. No. 3,763,088 describes a process wherein a non-crystalline thermoplastic resin is blended with uncured epoxy resins. The blends can be prepared by dry blending and fusion mixing the ingredients in a melt extruder at elevated temperatures. The hot melt may be shaped by injection molding. The relative quantity of epoxy resin is chosen such that a final structure results in a continuous phase of polymer particles in which uncured epoxy resin particles have been dispersed. To obtain such a structure it is essential to use epoxy resins with a molecular weight which is sufficiently high. The examples use epoxy resins with molecular weights of 3600 to 8,000.

U.S. Pat. No. 4,623,558 describes a process wherein a thermoplastic resin is blended with an uncured epoxy resin and a thermal initiator or a photo initiator at a temperature below the curing temperature of the system. The blend after combination with glass mats is heated and cured. For polymers with high melting temperatures or high glass transition temperatures, such as polyphenylene ethers, it is however not possible to get homogeneous blends of the polymer, the epoxy resin and the initiator at temperatures below the curing temperature when the relative amount of thermoplastic resin is too high. In practice the process this patent is only suitable for the processing of blends which after curing form a continuous phase of a cured epoxy resin in which particles of the thermoplastic polymer have been dispersed.

U.S. Pat. No. 5,382,384 and its parent U.S. Pat. No. 5,250,228 describe a process wherein a thermoplastic resin, a thermosetting resin, a conductive filler and a curing agent are mixed together wherein the mixture is shaped below the curing temperature of the mixture and wherein the shaped mixture is heated quickly to the curing temperature and is cured at the curing temperature. The mixing is performed below the curing temperature of the curing agent. As described before this makes it impossible for high melting polymers like polyphenylene ether to be used in relatively large quantities.

European patent application EP-B-0 537 005 describes a process for the manufacture of prepregs wherein a polyphenylene ether polymer is blended with a liquid epoxy material, optionally with a flame retardant and a catalyst, at a temperature of 100–130° C. The blend is subsequently granulated into particulates and the particulates are combined with one or more reinforcing cloth or fiber and the thus obtained combination is cured under pressure at 210° C. to 250° C. The blending of the polyphenylene ether and the epoxy are performed at a temperature below the curing temperature of the epoxy resin. This limits the possibilities of the process considerably.

In Polymer, Vol. 35, no. 20, 1994, page 3450 has been described a process wherein solutions of an epoxy and polyphenylene ether (PPE; a thermoplastic resin) are prepared in a Brabender kneader at 175° C. by kneading for about one hour. As an alternative it has been proposed to prepare the blend by mixing for 5–10 minutes in a co-rotating twin screw extruder. Subsequently a curing agent is added to the homogeneous solution in the Brabender mixer for about two minutes, the obtained compound is compression moulded and cured by curing cycles of two hours followed by a post-cure treatment of four hours at 200° C.

Mixing of epoxy/PPE mixtures, in particular those with more than 20% by wt of PPE, at temperatures of 175° C. results in compositions which are too viscous for many commercially useful shaping processes such as injection molding.

It has now been found that even with curing agents or catalysts which are fast at the chosen melt mixing temperatures it is possible to work at high temperatures (in the case of PPE at temperatures of over 220° C.) without causing premature reaction of the epoxy resin. This can be achieved by ensuring a quick mixing. The mixing time in the second step of process of the invention may, depending upon the nature of the constituents and the required temperatures, be far below two minutes.

The present invention provides a simple but effective process for the shaping of polymer blends comprising one or more thermoplastic polymers and an uncured thermosettable and/or polymerizable epoxy resin. With the process of the present invention it is possible to use relatively fast curing and/or polymerization systems resulting in short cycle times. With the process of the invention it becomes possible to shape polymers at temperatures below their normal processing temperatures. This is of importance for the processing of thermoplastic materials which are unstable or sensitive to oxidation at their processing temperature. With the process of the present invention it also becomes possible to incorporate into polymers materials that are thermally unstable at the usual processing temperature of the polymer. With the process of the invention it is possible to shape the blend and to cure and/or polymerize the epoxy resin in the blend after the shaping step even when relatively large quantities of thermoplastic resin with a high melting point or a high glass transition temperature are used.

SUMMARY OF THE INVENTION

The present invention provides a process for preparing a polymer composition comprising: melt mixing at least one thermoplastic polymer at a temperature above the glass transition temperature or above the melting temperature of the thermoplastic polymer with one of (i) an uncured epoxy resin, or (ii) an epoxy curing agent or a catalyst to form a blend; (b) further melt mixing at a temperature above the glass transition temperature or above the melting temperature of the thermoplastic polymer the other of (i) an epoxy resin, or (ii) a epoxy curing agent or a catalyst, with the blend in (a) to form a substantially uncured but essentially curable and/or polymerizable composition; (c) optionally forming a shaped product from the composition in (b); and (d) fast curing and/or fast polymerizing the optionally formed shaped product.

DESCRIPTION OF DRAWINGS

The figures schematically illustrate suitable apparatus for the process of invention.

In FIG. 1 the mixing head of a two component co-injection molding machine is schematically shown. Two low viscous polymer masses are fed through channels 1 and 2 into the static mixers (4) which have been mounted in a nozzle 3. The polymeric masses can be for example the blend of a thermoplastic polymer and an uncured epoxy resin on the one hand and a blend of a carrier resin and a curing agent or catalyst. Upon mixing in the static mixers 4 a substantially uncured but essentially curable composition is obtained which leaves the orifice of nozzle 3 for optional further shaping and curing.

The adapted extruder of FIG. 2 is provided with two feed ports. Feed port (1) at the throat of the extruder and feed port (2) near the exit nozzle of the extruder. Extruders basically consist of a series of barrels forming a long tube like structure within which a screw or a double screw is installed. The screw comprises several sections. As shown in FIG. 2 by a different type of shading the screw is preferably provided near feed port (2) with a section assuring a thorough mixing of all ingredients.

FIG. 3 schematically shows the extruder of FIG. 2 in combination with means to prepare a prepreg. In FIG. 3 one or as actually shown two rolls (3) feed glass mats together with the low viscous composition coming out of the extruder to two pairs of rolls (4). Rolls (4) combine the glass mats with the composition coming from the extruder into a prepreg.

DETAILED DESCRIPTION OF THE INVENTION

Figure 1:
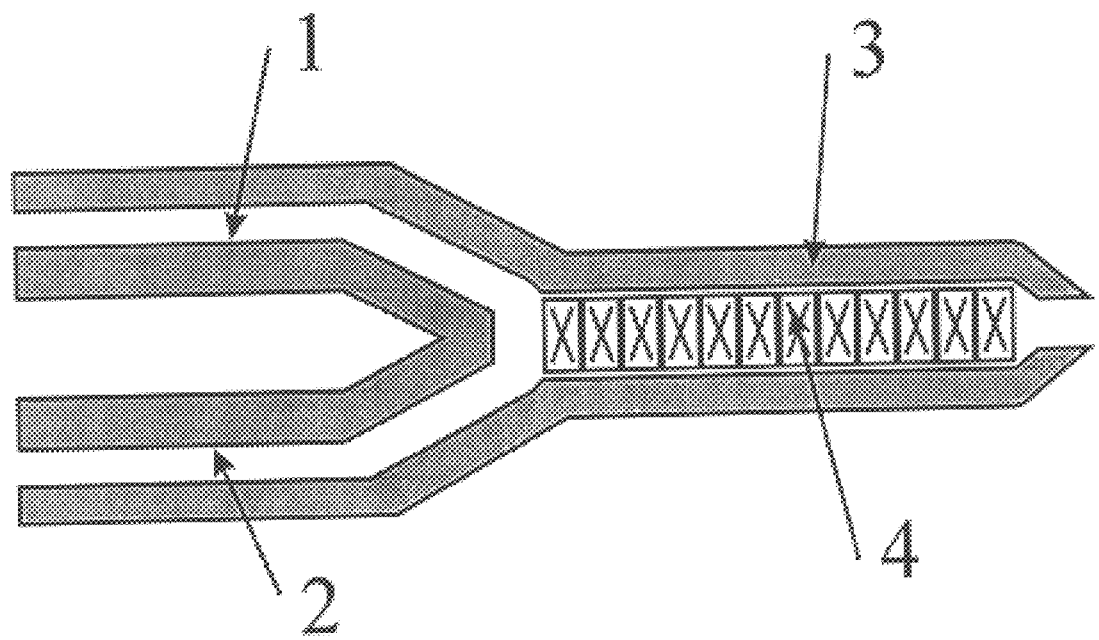
FIG. 1 shows the modified nozzle of a so called two component co-injection molding machine.

The present invention provides a process for preparing a polymer composition, the process comprising:

(a) melt mixing at least one thermoplastic polymer with one of (i) an uncured epoxy resin, or (ii) an epoxy curing agent or a catalyst to form a blend;

(b) further melt mixing the other of (i) an epoxy resin, or (ii) a epoxy curing agent or a catalyst, with the blend of step (a) to form a substantially uncured but essentially curable and/or polymerizable composition;

(c) optionally forming a shaped product from the composition of step (b); and (d) fast curing and/or fast polymerizing the optionally formed shaped product.

A preferred embodiment provides a process, wherein a combination of an epoxy resin and an epoxy curing agent or catalyst is used which shows at the temperature used for the melt mixing in step (b) of the above process phase separation within two minutes as evidenced by an increase in the viscosity.

In another preferred embodiment the curing step (d) of the above process is performed within sixty minutes.

Another preferred embodiment provides a process wherein the relative quantities of at least one thermoplastic polymer, the uncured epoxy resin, and the epoxy curing agent or catalyst are chosen such that after step (d) at least one thermoplastic polymer forms a continuous phase. The required quantities will depend upon the exact nature of the different components. The required quantities can be easily determined by the preparation of a series of different compositions with different ratios by weight between the at least one thermoplastic polymer and the epoxy resin, and by shaping and curing. The cured products so obtained can be analyzed by electron microscopy to determine the morphology of at least one thermoplastic phase in the cured product.

There will be a division between those compositions with a relatively low content of at least one thermoplastic polymer wherein the thermoplastic polymer is dispersed within a continuous phase of cured epoxy resin and those compositions with a higher content of the thermoplastic polymer wherein the thermoplastic polymer forms a continuous phase.

In the case of a continuous phase of the thermoplastic polymer there are two possibilities which both belong to the preferred structure. One wherein the epoxy resin is dispersed in a discontinuous way in the continuous phase of the thermoplastic polymer. The other wherein the epoxy resin also forms a continuous phase and whereby the continuous phase of the thermoplastic polymer and the epoxy resin are intertwined and form a so-called interpenetrating network.

Another preferred process is one wherein the thermoplastic polymer and the one of an uncured epoxy resin or a epoxy curing agent or catalyst blend is formed in the upstream part of a melt extruder, and the mixing of the other of an epoxy resin or a epoxy curing agent or catalyst with the blend occurs in the downstream part of the extruder forming the substantially uncured but curable and/or polymerizable composition. A preferred process is one wherein the epoxy curing agent or catalyst is pre-blended with a carrier.

Yet another embodiment of the present invention provides a process wherein at least one of a static or dynamic mixer is used to form the substantially uncured but essentially curable and/or polymerizable composition by mixing the other of an epoxy resin or a epoxy curing agent with the blend, wherein preferably the epoxy curing agent or catalyst is pre-blended with a carrier.

A preferred process of the present invention is one wherein the epoxy resin is at least partially cross linked after curing or polymerizing. It is preferred that the uncured epoxy resin have a molecular weight of less than about 3,000.

Another embodiment provides a process wherein the substantially uncured but essentially curable and/or polymerizable composition is extruded to form a powder, granulate, film, or sheet. Also provided by the present invention is a prepreg formed by the process of the present invention. Preferred thermoplastic polymer comprises at least one of a polyphenylene ether, polyetherimide, polyester, aliphatic polyketone, or syndiotactic polystyrene.

Another aspect of the present invention provides a process to make reinforced prepregs, the process comprising:

(a) melt mixing at least one thermoplastic polymer and one of (i) an uncured epoxy resin, or (ii) an epoxy curing agent or catalyst to form a blend;

(b) further melt mixing the other of (i) an uncured epoxy resin, or (ii) an epoxy curing agent or a catalyst with the blend of step (a) to form a substantially uncured but essentially curable and/or polymerizable composition; and (c) combining a reinforcing agent with the composition of step (b) in the molten state to form a reinforced prepreg.

Preferred reinforcing agents are powdered glass, chopped glass, glass mats, polymeric reinforcing fibers or mats and inorganic fillers and fibers. Examples of polymeric fibers are those made out of poly(ethylene terephthalate), polyamide 6 or 6,6 or 4,6. Suitable inorganic reinforcing agents are Rockwool fibres and the like.

A further preferred process is one wherein the glass mats are combined with the blend, immediately after extrusion, but before the solid blend is formed. Also provided is a prepreg obtained by a process of the invention.

Processing

Upon curing and/or polymerization of the epoxy resin phase separation of the epoxy resin occurs. Upon curing and/or polymerization the polymer blend becomes much more viscous as can be determined by measuring the viscosity of the molten blend. With substantially no curing is meant that the increase in the viscosity (after an initial decrease upon melting) has not yet started.

In the process of the invention the relative quantities of at least one thermoplastic polymer and epoxy resin are preferably chosen such that after curing and/or polymerization the thermoplastic polymer forms a continuous phase in which particles of cured and/or polymerized epoxy resin are dispersed or such that the polymer phase and the epoxy phase form an interpenetrating network.

In the process of the invention it is possible to incorporate other components. This is possible in steps (a) and (b) of the process.

Any shaping step is suitable for the process of the invention: by injection molding; or by compression molding; or by injection-compression molding. With the process of the invention it is possible to combine steps (b) and (c) by performing step (b) at elevated temperatures and keeping the shaped product for a sufficient time at the elevated temperature to fast cure and/or fast polymerize the epoxy resin.

It is possible to change the process of the invention by including additional steps. It is essential however that the process includes steps (a) and (b) of the process as described. It is for example possible to make first a blend of the curing agent and a carrier by melt blending, followed by extruding the so obtained blend and by pelletizing it. The obtained pellets can then be used in step (a) of the claimed process. It is also possible to cool and solidify the blend of step (a) quickly and reheat it before shaping it.

Blending the curing agent and/or the catalyst with the thermoplastic resin and the epoxy resin with standard processes in standard compounding machines such as extruders, has been demonstrated to produce premature curing of the epoxy resin, making it almost impossible to shape the obtained blends. This is in particular the case upon the use of the preferred fast curing agents required for short cycle times. It has been surprisingly found that the components can be efficiently mixed using a process of the present invention. Good mixing can be achieved quickly with a short residence time to avoid substantial curing or polymerization. The process of the invention can be performed for example with special mixing devices. These mixing devices can be mounted for example at the nozzle of the extrusion machine and can be used for the preparation of the substantially uncured but essentially curable and/or polymerizable composition of step b.

Illustrative examples of suitable mixing devices are:

1. Static mixing elements commercially Sulzer, Kenics, Komax, or Ross mixers). Static mixers of Sulzer design consist of a set of metal bars, causing strong disruption of linear melt flow giving agitation and mixing of the different streams of material. A static mixing element according to the design and description of Sulzer A.G. has been successfully used 2. Dynamic mixing elements (e.g., cavity transfer mixer, "CTM", extruders). The dynamic mixing element of cavity transfer mixer consists of a movable ring with holes, which by rotating in a melt flow causes agitation and mixing.

Suitable cavity transfer mixers with a dosing system have been described by G. M. Gale, RAPRA Technology Ltd., "Mixing of Solid and Liquid Additives into Polymers Using Single Screw Extruders", ANTEC '91, 95, or G. M. Gale; British Plastics & Rubber, Jun. 10, 1994, and are incorporated herein by reference.

In a preferred embodiment of the process of the present invention the thermoplastic polymer(s) and the epoxy resin are melt blended in an extruder; the curing agent and/or catalyst and a carrier polymer, which may be the same as the thermoplastic polymer(s), are melt blended in a second extruder and the molten extrudate of both feeders is fed simultaneously to a mixing device such as a static or a dynamic mixer wherein the two extrudates are quickly blended.

Sufficient mixing of the curing agent and/or catalyst with the blend of the thermoplastic polymer(s) and the epoxy resin is important to obtain good mechanical and thermal properties of the final product after curing or polymerization. The process of the invention is also very useful for the manufacture of sheets made out of thermoplastic polymer (s), reinforced with fiber mats such as glass fiber mats.

One suitable type of extruder for making the necessary blend of step (a) of claim 1 and the curable and/or polymerizable composition of step (b) of the process is a fully intermeshing co-rotating multibarrel twin screw extruder such as available from Werner-Pfleiderer.

Figure 2:
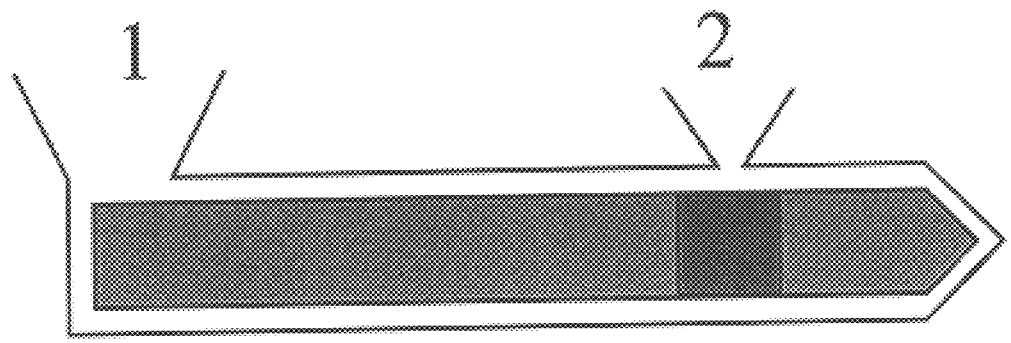
FIG. 2 shows an adapted extruder suitable for the process of invention.

In one of the several process options suitable for the process of the present invention, a multi-barrel twin screw extrusion device (as is schematically shown in FIG. 2) is configured in such a way that for example a pre-extruded blend of a polyphenylene ether (PPE)/epoxy resin, which shows very high flow and requires considerably lower melt temperatures than pure PPE, can be added in the feed-throat (1) of the extruder. The barrel set temperatures and the screw design are such that the thermoplastic polymer, for example PPE, and epoxy resin are melted and mixed in the upstream portion of the extruder. The barrel temperature ranges from about 150° C. to about 300° C., if the thermoplastic is PPE. The temperature range in the upper barrel zones of the extruder for melting and mixing the thermoplastic resin, is then at or above the Tg (glass transition temperature) or the melting point of the thermoplastic resin. Then at the downstream barrel zones of the extruder, the melt mixed molten blend of the thermoplastic and the epoxy resin is blended with a suitable epoxy resin curing agent and/or catalyst (for simplicity hereinafter sometimes will be referred to a "curing agent" only where a curing agent and/or a catalyst is intended) by adding the curing agent in a downstream portion of the barrel using a side feeder (2). It is preferred to use mixing elements such as turbine mixing elements, gear mixing elements or kneading blocks right next to the side-feed opening to facilitate the mixing of PPE/epoxy with the curing agent. Adding the curing agent in the downstream barrel zone of the extruder shortly before the molten blend exiting the extruder is found to be important in compounding the fast curing system into PPE/epoxy. The blends comprising PPE, epoxy, and curing agent are then pumped in molten form through a pelletizing die to a water bath and pelletizer, or through a sheet die to nip roll pairs for sheet/film extrusion, or through a sheet die, then combined with glass mat or glass fiber in nip roll pairs or double belt lamination device for glass mat reinforced composite manufacture. The extruded blend is then further molded and the epoxy resin component of the molded article is cured under phase separation of the epoxy resin.

Alternatively, the curing agent, in the form of a pre-extruded concentrate in a thermoplastic such as PPE, can be added in a downstream barrel zone of the extruder. The pellets prepared from this process are further compression molded and cured.

In yet another embodiment, PPE powder was added into the feed-throat (1) of the extruder, liquid epoxy resin was injected in the extruder by a gear pump between feed throat (1) and side feeder (2), and a curing agent was added by a side-feeder (2). Alternatively, the epoxy resin may also be split into several streams and then fed into the extruder.

The high flow PPE/epoxy/curing agent blends are particularly suitable for composite applications. In such applications a pre-blended thermoplastic/epoxy such as PPE/epoxy can be added in the feed-throat of the extruder; the downstream addition of curing agent is maintained for the sheet extrusion and glass mat reinforced composites manufacturing. The thermoplastic PPE resin and epoxy resin are melted and mixed in the upstream portion of the extruder. Then at the downstream zones of the extruder, the melt mixed molten blend of the thermoplastic (e.g., PPE) and the epoxy resin is admixed with a suitable epoxy resin curing agent by adding the curing agent in a downstream barrel through a side feeder. The blend comprising PPE, epoxy, and curing agent is then pumped in molten form through a sheet die, then chilled nip rolls to draw down and solidify the sheet after it comes out of the extruder. The sheets prepared are further combined with glass mat by stacking the sheets and the glass mats in alternating layers, compression molded, and cured to make glass fiber reinforced composite articles.

Figure 3:
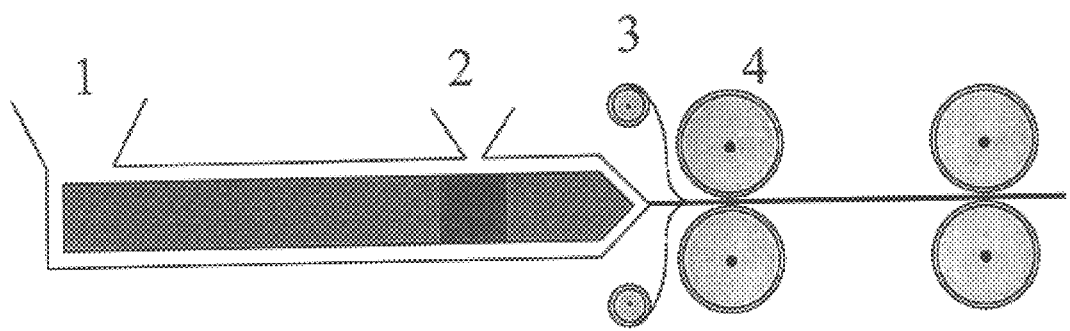
FIG. 3 shows an apparatus for the continuous manufacture of prepregs.

Alternatively, the glass mat reinforced composites may be prepared by combining the glass mats immediately with the extruded sheets in a controlled manner, as illustrated in FIG. 3. The blends are extruded into sheets, and glass mats of the appropriate dimension are combined with the aid of rollers (3) immediately with the sheet. The resulting sandwich of PPE/epoxy/curing agent blend sheet and glass mat is carefully kneaded by a series of rolls (4) or a double-belt lamination apparatus to impregnate the glass completely with the sheet.

Components
Polymer(s) (e.g., thermoplastic resin).

In the process of the present invention can be used any thermoplastic resin or combination of thermoplastic resins. The process of the invention is, however, in particular advantageous when it is desired to mold and shape polymer blends with a high melting point or a high glass transition temperature. Examples of such polymer blends are blends comprising polyphenylene ethers, aromatic polycarbonates, aromatic polysulfone resins, polyethersulfones, polystyrene, syndiotactic polystyrene, polyamides, phenoxy resins, polyimides, polyetherimides, polyetherimide/silicone block copolymers, polyurethanes, polyesters, acrylic resins, styrene/acrylonitrile resins, styrene block copolymers and aliphatic polyketones (as described for example in EP-A-0 121 965 and EP-A-0 213 671).

The above mentioned polymers are well known and most of them are commercially available from various sources.

Other thermoplastic resins useful in for the invention are e.g. those mentioned in U.S. Pat. No. 4,528,346 or in EP-A-0 148 493, and are incorporated herein by reference.

Very suitable thermoplastic polymers are the polyphenylene ether resins (generally abbreviated as PPE). A commercially available PPE is poly(2,6-dimethyl-1,4-phenylene ether). Also useful are copolymers with various phenolic monomers indicated below, or the polymer with endgroups containing amines chemically bonded (so called "Mannich-ends"). The PPE may be of a number average molecular weight of about 1000 to about 80,000, as described in U.S. Pat. No. 4,853,423. Additional description of "PPE" can be found in U.S. Pat. Nos. 4,496,695 and 5,141,791, or EP 0 557 086. Suitable PPE's are also end-group modified and "capped" PP's or otherwise "modified" PPE's. Also included "functionalized" PPE's wherein the PPE has been modified with reactive groups as described in EP-A-0 283 775. The PPE resins and modified PPE resins according the present invention can also be admixed with styrene polymers (vinyl aromatic (co-)polymers) and the graft polymers with other polymers as described in EP-A-0 557 086. The styrene (co) polymers can be polystyrene (PS), crystal clear polystyrene (ccPS), high impact polystyrene (HIPS). Specifically can be mentioned here styrenic copolymers with acrylonitrile and optionally rubbers (styrene-acrylonitrile copolymers) (SAN), acrylonitrile-butadiene-styrene terpolymers, acrylonitrile-styrene-acrylate terpolymers and styrene-maleic anhydride copolymers. High acrylonitrile SAN, and polyacrylonitrile, and high maleic anhydride copolymers are useful in this process. Blends of these copolymers with PPE are also useful.
Epoxy resin (uncured thermosettable and/or polymerizable epoxy resin).

The epoxy resin serves as a plasticizer for the thermoplastic polymer in the present invention. Epoxy resin is used herein to mean any of the conventional dimeric, oligomeric or polymeric epoxy materials containing at least one epoxy functional groups. Useful compounds are described in: U.S. Pat. No. 5,250,228 or EP-A-0 148 493; and are incorporated herein by reference.

Particular useful are compounds obtained by condensation of epichlorohydrine with bisphenol A or bisphenol F. Useful in particular are epoxy resins with a molecular weight of about 120 to about 12,000 (as described in U.S. Pat. No. 4,496,695). More preferred are epoxy compounds with a molecular weight between 200 and 1,000, with a molecular weight between 200 and 800 being particularly preferred. Particularly useful are epoxy resins obtained by condensation of epichlorohydrine and bisphenol A. These are available in different molecular weights, depending on the number of bisphenol-A (BPA) units incorporated in the molecule. An overview can be found in "Epoxy Resin Manual, Comparative Date, Form No. 296-00579, DOW, (1979)" or "The Long and the Short of Epoxy Resins, SHELL, (1992)" and is incorporated herein by reference. The basic type, which was also used in the experiments underlying the present invention, consists of essentially one BPA with glycidyl groups on both phenolic ends (hereafter referred to as "BADGE"). These are commercially available under names like Epikote® 828 (SHELL), D.E.R. 331 (DOW), Araldite® GY250 or in the USA 6010 (Ciba-Geigy). The molecular weight of these compounds is about 380.

The BADGE epoxy resin may also be admixed with epoxy resins containing only 1 epoxy group and/or compounds used as "diluents", additives to further modify flow. See "Epoxy Resin Manual, Comparative Date, Form No. 296-005-79, DOW, (1979)".

Other groups of specific interest are epoxy-group modified resins based on cycloaliphatic compounds (e.g., ERL-resins, Union Carbide), phenolic-based resins (e.g., EPN-resins, Ciba-Geigy) and cresol-based resins (e.g. ECN-resins, Ciba-Geigy).

Curing agent and/or catalysts.

Curing agent and/or catalysts are used to facilitate conversion of a low molecular weight epoxy resin into a high molecular weight, usually crosslinked, resin no longer miscible with the thermoplastic polymer(s).

Curing agents are defined as agents which react stoichiometrically with the epoxide groups on the epoxy resins.

Useful classes of curing agents are materials selected from the following list aliphatic amines, aliphatic amine adducts, aromatic amines, aromatic amine adducts, amidoamines, polyamides, cycloaliphatic amines, anhydrides, polycarboxylic polyesters, isocyanates, phenol-based resins (such as phenol or cresol novolak resins, phenol terpene copolymers, polyvinyl phenol copolymers, bisphenol-A formaldehyde copolymers, bishydroxyphenyl alkanes).

Catalysts as used in the instant invention are compounds that initiate polymerization of epoxide groups, or accelerate reaction of curing agents with epoxide groups. Illustrative examples of catalysts are Listings of curing agents are found in Encyclopedia of Polymer Science and Engineering and incorporated by reference herein. Curing agents useful in the present invention are listed in U.S. Pat. Nos. 5,250,228 and 4,623,558, and are incorporated herein by reference. Lewis acid salts, $BF_3$ complexes, imidazoles, dicyandiamide, and phosphonium salts. A detailed list of catalysts is provided in U.S. Pat. Nos. 4,833,423 and 4,496,695, and is incorporated herein by reference.

Curing agents and catalysts can be used in various combinations to obtain the desired reaction speed and properties. It is preferred to use combinations of epoxy resins and curing agents and/or catalysts which lead to a crosslinked epoxy resin. To this end, for instance, a bifunctional epoxy resin can be combined with curing agents having at least a triple functionality.

The curing agent and/or catalyst is generally added as late as possible to minimize unwanted premature reactions (polymerization, curing) of the epoxy resin in the blend. In those cases where the curing agent and/or catalyst also plasticize at least one thermoplastic polymer sufficiently to enable easy blending at elevated temperatures, the curing agent and/or catalyst can be blended first, but the epoxy resin should then be added as late as possible.

Useful means of applying heat (required for the reaction of the epoxide) to the system can be done using a single or double screw extruder or double barrel injection unit like the commercially available Battenfeld 2 K co-injection molding machine. Means of heating the material directly or indirectly via the mold have been listed in U.S. Pat. Nos. 4,623,558 and 4,496,695. These include UV radiation, sun lamp, electromagnetic heating, high frequency inductive heating and high frequency dielectric heating, ionizing radiation, and electron beams.

Additional components may be used in the blends processed with the process of the invention.

It is known to one skilled in the art that the blends made by the processes of the instant invention can comprise fillers like chalk, clay, MgO, mica, fibrous fillers (glass fibers, woven or non-woven glass mats, natural fibers, carbon fibers, carbon fiber mats, synthetic fibers, polymeric fibers, such as polyamide, polyester or polyaramid fibers), rubber materials, stabilizers, conductive additives, flame retarding additives, $Mg(OH)_2$, pigments, waxes and lubricants. An extensive enumeration can be found in EP-A-0 557 086, EP-A-0350 696, U.S. Pat. No. 4,496,695, and DE 37 11 757.

Various means of mixing these non-essential components may be applied. These can be added during the process of blending thermoplastic polymer(s) and the epoxy resin or even at the moment where the uncured, but polymerizable composition is formed or shaped (but before substantial reaction between the epoxy resin and the curing agent and/or catalyst has taken place).

Composition and composition ranges of interest

The goal of the present invention is to obtain high heat resistant, high impact thermoplastic product which can be easily obtained within a short cycle time due to the use of a high-flowing thermoplastic composition during molding and shaping. When using PPE as the thermoplastic polymer, a continuous-phase PPE blend can be obtained using PPE-contents as low as 22% (Makromol. Chem., Macromol. Symp. 75, 73–84 (1993)/Polymer 35(20), 4349 (1994)). This depends however on the exact nature and concentration of the components in the blend.

The preferred embodiment of the present invention comprises from about 22% to about 99% by weight of the total composition of PPE, from about 5% to about 77% by weight of the total composition of an epoxy resin, and from about 1% to about 25% by weight of the total composition of a curing agent/curing catalyst.

In a preferred embodiment of the invention a combination of an epoxy resin and an epoxy curing agent or catalyst is used which shows phase separation within two minutes at the temperature used for the melt mixing in step (b) of the process as evidenced by an increase in the viscosity.

Tests for evaluation of time to phase separation are performed in an internal mixer (Haake Buchler Rheocord 40 System). 60 Grams of a mixture comprising at least one thermoplastic polymer, the epoxy resin and the epoxy curing agent or catalyst are kneaded at the temperature used for the second melt mixing step of the process of the invention and 48 RPM. The relative quantities are the same as used when performing the process of the invention. The torque is continuously monitored using the machine built-in measurement system. Upon addition of the ingredients in the kneader, the torque initially increases (melting of the ingredients) then stabilizes at a lower value. As the cure reaction starts, phase separation occurs resulting in a viscosity increase, requiring higher torque to stir the system. Time to onset of phase separation is taken as the time difference between the melting peak and the onset of the torque increase after the stable portion.

EXAMPLES

The compositions of the present invention were prepared using the following components. The examples are provided to illustrate the present invention and not to limit the invention.

PPE-1: Poly(2,6-dimethyl-1,4-phenylene ether) with an intrinsic viscosity in chloroform of about 40 ml/g (PPO® from GE Plastics) and with a Tg-value of 215° C. as measured by Differential Scanning Calorimetry.

PPE-2: Poly(2,6-dimethyl-1,4-phenylene ether) with an intrinsic viscosity in chloroform of about 46 ml/g (PPO® from GE Plastics) and with a Tg-value of 215° C. as measured by Differential Scanning Calorimetry.

BADGE: A commercially available Bisphenol A diglycidyl ether with a molecular weight comprised between 370 and 384 (Epikote 828 or Epon 828 from Shell). BADGE is a viscous liquid.

PA: Polyamide 6,6 with a viscosity number according to ISO 307 of about 150 ml/g used as curing agent (Ultramid A3 from BASF)

MCDEA: 4,4'-methylene-bis-(3-chloro-2,6-diethyl-aniline) used as curing agent. (Lonzacure M-CEA from Lonza)

MDEA: 4,4-methylene-bis-(2,6-diisopropyl-aniline) used as curing agent (Lonzacure M-DEA from Lonza).

2-PHIM: 2-phenyl imidazole used as catalyst (from Aldrich)

Comparative Example 1

The process as described in POLYMER, Vol. 35, no 20, 1994, page 4350 has been performed at elevated temperatures to try to obtain quicker processing and lower viscosity materials that can be easier shaped.

About 40 grams of a blend of 41.2 parts by weight (pbw.) PPE-1, 27.5 pbw. BADGE, 30 pbw. glass fibers and 1.37 pbw. $TiO_2$ was thoroughly mixed in a Haake Internal Mixer at a temperature of 280° C. About 20 gram of a premixed blend of 42 pbw. of PPE-1, 28 pbw. PA (acting as a curing agent), 30 pbw. glass fibers, 0.07 pbw. carbon black and 0.5 pbw. citric acid was added to the blend in the Haake Internal Mixer (at 280° C.) and admixed for two minutes. The curing reaction was so quick that it was almost impossible to remove the obtained compounded product from the Haake Internal Mixer. Furthermore the viscosity was so high that it was not well possible to mold the obtained product by normal compression molding.

Comparative Example 2

A first preblend of 60 (parts by weight) pbw. PPE-1, 40 pbw. PA, 0.07 pbw. Carbon black and 0.5 pbw. Citric acid was prepared by melt mixing in an extruder. A second preblend was prepared by melt mixing 58.8 pbw. PPE-1, 39.2 pbw. BADGE and 2 pbw. TiO2.

The first and the second preblend were melt mixed (in a weight ratio of two parts of the first preblend and one part of the second preblend) in a twin screw extruder of the same type as described here below in example 1 by feeding the two preblends to the throat of the extruder. Thirty pbw. glass fibers per 100 pbw. of the mixture of the two blends were added downstream in the extruder. The temperature was set at 270° C. The screw speed was 300 rotations per minute.

It was not possible to compound this composition properly, since the epoxy and the curing agent started reacting in the extruder, resulting in a very unstable extrusion of the strand.

Example 1

Two blends containing PPE-1, chopped glass fibers, BADGE (respectively PA) and additives were compounded in a twin screw extruder. Composition of the blends is reported below:

TABLE 1

| Composition (parts by weight) | Blend 1 | Blend 2 |
| --- | --- | --- |
| PPE-1 | 41.2 | 42 |
| BADGE | 27.5 | |
| PA | | 28 |
| Glass fibers | 30 | 30 |
| TiO2 | 1.37 | |
| Carbon black | | 0.07 |
| Citric acid | | 0.5 |

The chemical nature of the chosen components is such that phase separation and crosslinking of the epoxy resin may be expected when Blend 1 and Blend 2 are thoroughly mixed in the melt above 250° C.

Blend 1 was compounded into pellets on a on a Werner-Pfleiderer ZSK 25 corotating twin-screw extruder. All ingredients were added in the throat of the extruder through a hopper except BADGE which was added with a gear pump. The barrel temperature profile was 200° C., 6×270° C.; die head temperature was 270° C.; screw speed was 300 RPM and the temperature of the melt was about 325° C.

Blend 2 was compounded into pellets in two steps on a Werner-Pfleiderer ZSK 28 corotating twin-screw extruder. All ingredients except glass were compounded in the first step with upstream feeding. In the second step, pellets from step 1 were recompounded with glass. The preblend was added upstream in the throat feed, glass was added downstream. Experimental conditions were as follows:

| | step 1 | step 2 |
| --- | --- | --- |
| temperature settings: | 280–300° C. | 280–300° C. |
| screw speed: | 300 RPM | 300 RPM |
| throughput: | 14 kg/h | 10 kg/h |
| temperature of melt | about 325° C. | about 350° C. |

Citric acid was used to compatibilize PPE with PA. Titanium dioxide and carbon black were added in blend 1 and 2 respectively to help visual assessment of mixing homogeneity in the next step. Extrusion behavior was stable.

Pellets of blends 1 and 2 were melted separately in the two aggregates of a Battenfeld 2K co-injection molding machine (BM-T 4000/2×2500) equipped with two 75 mm screws. The barrel temperatures were 250° C. and 300° C. for blends 1 and 2 respectively. The machine was fitted with a heated mixing head (as schematically shown in FIG. 1) comprising a long nozzle (3) adapted to the machine head, provided with two channels (1) and (2). The nozzle contained a variable number of static mixers (4) (Sulzer SMK R22). The two melt streams were kept separate in channels (1) and (2) until reaching the nozzle (3) and fed to the mixing elements in a ratio by weight of two parts of blend 1 per one part of blend 2. The mixing head was kept at a temperature of about 280° C. At this temperature a composition with a low viscosity suitable for injection molding was obtained. The mixed melt (after leaving nozzle 3) was injection molded into a square sheet with dimensions 500×500×3 mm. Injection time was about 4 seconds. The actual mixing time is only a fraction of the total injection time. The mold temperature was about 60° C. Under these conditions, the epoxy phase did not cure nor phase separate, as evidenced by one single measured Tg of 124° C. for the blend.

Mixing homogeneity was first assessed by visual appearance. The molded plaques were also subjected to Nitrogen elemental analysis. This was performed on a CARLO ERBA instrument NA1500. Small samples (5 mg) were drilled out of molded plaques. Twenty-five samples were taken on a 50×50 mm square grid for the analysis. Average and standard deviation were calculated from all 25 measurements.

Test specimens of cured phase-separated material were obtained by compression-molding pieces of the injection-molded plaques at 240° C. for one hour in a vertical press at a pressure of about 2 MPa. Teflon-coated Aluminum foils were used to avoid sticking to the steel plates.

The results are reported in Table 2 and 3 as a function of the number of static mixer elements.

TABLE 2

Results of Nitrogen elemental analysis and visual inspection on mixed blends 1 and 2 as function of number of mixing elements

| | Nitrogen analysis | | |
|---|---|---|---|
| | average value (% N) | relative standard deviation (s/x)[1] | visual appearance |
| 0 static mixer elements | 1.62 | 35.0% | very inhomogeneous |
| 8 static mixer elements[2] | 1.17 | 6.5% | cloudiness |
| 12 static mixer elements | 1.18 | 2.1% | homogeneous |

[1]Standard deviation expressed as relative value: standard deviation divided by average (in percent)
[2]average of two experiments The above test results show that a minimum number of 8 to 12 static mixers is optimal to achieve a good dispersion of the curing agent in the blend.

ture reaction in the extruder. As indicated in comparative example 1, MCDEA can be added upstream at the feed-throat.

In this example and several of the following examples, PPE-2 and BADGE is pre-compounded into a blend of 70/30 PPE to epoxy weight ratio. In the preparation of this blend, PPE is fed at the feed-throat of a Werner-Pfleiderer ZKS-30 10-barrel twin screw extruder at a rate 10 kg per hour, and liquid BADGE is injected into the extruder at barrel 5 at about 4.5 kg per hour using a gear pump. The following experimental conditions are used:

barrel temperature profile: 250° C., 8×270° C.,
die head temperature: 270° C.,
screw speed: 300 RPM.

The extrudate melt, upon exiting from the strand die, is cooled in a water bath and pelletized. This pelletized blend is called preblend A in subsequent descriptions.

A Werner-Pfleiderer 30 mm twin screw co-rotating 10-barrel ZSK-30 extruder (schematically shown in FIG. 2) was also employed to compound the curing agent into preblend A.

Preblend A was fed upstream, at (1) at a rate of 11.7 kg per hour. Curing agent MCDEA was added in downstream, at (2) in barrel 8 using a side-feeder for an overall rate of about 13.6 kg per hour. The screw of the extruder was provided at barrel 8 with turbine mixing elements to ensure a rapid and good mixing. For comparison purpose, MCDEA was added in the feed-throat, at (1) in barrel 1 instead of barrel 8 in one experimental run. Compounding of curing agent with PPE2 resin and epoxy resin was accomplished with the following experimental conditions:

barrel temperature: 220° C., 8×240° C.
die head temperature: 240° C.
screw speed: 300 RPM.

TABLE 3

Properties of cured as function of number of mixing elements

| | DMA measur. Tg (in ° C.) | | Temperature Performance | Mechanical Performance | | |
|---|---|---|---|---|---|---|
| | epoxy phase | PPE phase | Vicat B/120 (C.) | Unnotched Izod impact (kJ/m2) | Flexural Modulus (GPa) | Flexural Strength (MPa) |
| 0 static mixer elements | 80 | 150 | 152 | 6.7 | 3.5 | 50 |
| 8 static mixer elements[1] | 80 | 212 | 202 | 20 | 5.5 | 100 |
| 12 static mixer elements | 78 | 218 | 209 | 32 | 6 | 154 |

[1]average of two experiments
Glass transition temperatures were obtained by Dynamic mechanical analysis from Tan delta peak values. The conditions of the test were a heating rate of 2 C./min and a loading frequency of 1 Hz.
Vicat B temperatures were measured according to ISO 306
Unnotched Izod impact resistance was measured at room temperature according to ISO 180
Flexural modulus and Flexural strength were measured according to ISO 178

These results show the importance of proper mixing to obtain a product with excellent mechanical and thermal properties after curing. The presence of two Tg-values shows that phase separation has occurred.

Example 2

The purpose of this example is to illustrate that sufficient mixing of curing agent into molten PPE resin and epoxy resin can be achieved by downstream addition of curing agent in a corotating twin screw extruder (as shown schematically in FIG. 2) with the appropriate screw design and operating conditions. MCDEA was chosen as curing agent, because it reacts very slowly with BADGE and allows for the comparison of mixing without interference with prema- The extrudate melt, upon exiting from the strand die, is cooled in a water bath and pelletized. The total residence time in the extruder is about 30 sec; the mixing time after the side feeding is less than 10 seconds.

The pellets of the PPE-2/BADGE/MCDEA blend are compression molded into 100 mm diameter by 3 mm disk at about 240° C. for about 2 hours. The plaque was cut into 12 pieces of roughly the same size, and all pieces were tested by Nitrogen elemental analysis to measure the mixing uniformity. The results for downstream addition of MCDEA, as listed in Table 6, show that the mixing of curing agent MCDEA in preblend A blend is excellent for the downstream barrel 8 addition with the screw design and the experimental condition in this invention, and quality of mixing of the downstream addition of curing agent MCDEA is the same as that achieved by upstream barrel 1 addition of curing agent.

The glass transition temperature, Tg, of the cured blends was determined by DSC and DMA temperature scan methods. The results show that Tg of the epoxy phase cured by MCDEA is about 145–150° C., and that Tg of the PPE phase is about 220° C. Typical morphology of the cured PPE-2-BADGE-MCDEA blends measured by scanning electron microscopy show that the epoxy phase separates while curing into finely dispersed particles of approximately 1 micrometer in diameter in a continuous PPE matrix. In the final product, the thermoset epoxy acts as a rigid filler in the continuous thermoplastic PPE.

TABLE 4

Elemental analysis (N content) of the samples from molded plaques, targeted value is 1.1% in the feed streams

| | Nitrogen content | |
|---|---|---|
| MCDEA feed location | measured average (% N) | relative standard deviation (%)[(1)] |
| Barrel 1 (feed-throat) | 1.10 | 2 |
| Barrel 8 (near end) | 1.09 | 2 |

[(1)]see definition underneath Table 2

Example 3

A Werner-Pfleiderer 30 mm twin screw co-rotating intermeshing 10-barrel ZSK-30 extruder was employed to compound the curing agent into PPE-2 resin and BADGE resin. Preblend A was fed upstream in the throat-feed at a rate of about 12.1 kg per hour, curing agent MDEA was added in downstream barrel 8 using a side-feeder for an overall rate of about 13.6 kg per hour. Extrusion compounding of curing agent MDEA with PPE-2 resin and BADGE is accomplished with the following experimental conditions:

barrel temperature profile: 220° C., 8×240° C.
diehead: 240° C.
screw speed: 300 RPM.

The extrudate melt, upon exiting from the strand die, is cooled in a water bath and pelletized. The total residence time in the extruder is about 30 sec; the mixing time after the side feeding is less than 10 seconds. The pellets showed one single Tg-value of 79° C. demonstrating that no phase separation had occurred.

The pellets of blend comprising PPE-2, BADGE, and MDEA were compression molded into about 100×100 mm plaques at about 230° C. for about 1 hour. The plaques were cut into 12 pieces of roughly the same size, and all pieces were tested by nitrogen element analysis (N-content) to test the mixing uniformity. Table 5 summarizes the elemental analysis results for the seven plaques and total of 7×12=84 samples with each sample measured by three replicated tests. Based on the results of Table 5 it can be concluded that the mixing of curing agent MDEA in the PPE-2-BADGE blend is satisfactory. A DMA (dynamic mechanical analysis) scan shows that the cured blend is phase separated. The Tg of the MDEA cured epoxy phase is about 145–150° C., and the Tg of the PPE phase is 222° C.

TABLE 5

Elemental analysis (N content) of the samples from molded plaques, targeted value is 1.0% in the feed streams

| | Nitrogen content | |
|---|---|---|
| Plaque NO. | measured average (% N) | relative standard deviation (%)[(1)] |
| 1 | 1.04 | 1 |
| 2 | 1.04 | 1 |
| 3 | 1.00 | 1 |
| 4 | 1.06 | 1 |
| 5 | 1.06 | 1 |

[(1)]see definition underneath Table 2

Example 4

Curing agent MDEA and catalyst 2-PHIM in about a 95/5weight ratio were dry blended in a high intensity Henschel mixer. Preblend A was fed in the feed-throat of the extruder at a feed rate of about 121 kg per hour, and the resulted dry mixture of MDEA and 2-PHIM was then admixed downstream with the molten preblend A by feeding it at downstream barrel 8 at a feed rate of about 1.5 kg per hour using a side-feeder. Extrusion compounding of curing agent with PPE-2 resin and BADGE resin is accomplished with the following experimental conditions:

barrel temperature: 150° C., 2×220° C., 4×210° C., 2×190° C.
diehead: 180° C.
screw speed: 300 RPM.

The extrudate melt, upon exiting from the strand die, is cooled in a water bath and pelletized. The pellets showed one single Tg-value of 79° C. demonstrating that no phase separation had occurred. To get a full exothermic epoxy curing of such pellets about 12 minutes are required at 240° C. (according to a DSC measurement).

The pellets as obtained in this example and in the following example 5 can be used for example in the process described in the second part of example 1.

Comparative Example 3

In this example it has been attempted to prepare a blend with the same composition and the same curing agent and catalyst as in example 4 by the method referred to in comparative example 1. First 55 grams of a PPE-1/epoxy preblend were added into the Haake Internal Mixer at 240° C. After five to ten minutes mixing about 7 grams of a MDEA/2-PHIM preblend were added. The viscosity showed, due to phase separation, a steep increase within a minute, making it impossible to use the obtained compounded product for compression molding.

Example 5

In this example, PPE-2 and BADGE are pre-compounded into blends with 60/40 weight ratio of PPE-2 to BADGE. In the preparation of this blend, PPE-2 is fed at the feed-throat of a Werner-Pfleiderer ZKS-30 10-barrel twin screw extruder at a rate of 6.8 kg per hour and BADGE is injected into the extruder at barrel 5 at about 4.5 kg per hour. Extrusion compounding is accomplished with the following experimental conditions:

barrel temperature: 250° C., 4×270_° C., 250° C., 240° C., 2×220° C.
die head temperature: 260° C.
screw speed of about 500 PM.

The extrudate melt, upon exiting from the strand die, is cooled in a water bath and pelletized. The resulting product is called preblend B in subsequent descriptions.

Curing agent MDEA and catalyst 2-PHM in about a 95/5 weight ratio were dry blended in a high intensity Henschel mixer. Then about 40 parts of the mixture was blended again with about 60 parts of PPE-2 using the Henschel mixer. The mixture comprising PPE-2, MDEA, and 2-PHIM was next fed into the feed-throat of a Werner-Pfleiderer ZSK-30 twin screw extruder at a feed rate of about 6.8 kg per hour. Compounding was accomplished with the following experimental conditions:

barrel temperature profile: 150° C., 5×230° C., 3×190° C.,
die head temperature: 210° C.,
screw speed: 300 RPM.

The extrudate melt, upon exiting from the strand die, was cooled in a water bath and pelletized. The resulting product is called preblend C in subsequent descriptions.

The extrudate melt, upon exiting from the sheet die, was cooled, drawn down into desired thickness, and solidified at room temperature into sheets. The sheets showed one single Tg-value of 72° C.; a sign that no phase separation of the epoxy resin had occurred. The dimension of the extruded sheets was about 125 mm in width and approximately 0.66 mm in thickness. The sheets were then combined with highly needled random glass mats of the type used for Polypropylene Glass Mat Reinforced composites (weight of about 640 grams per square meter) into a plaque mold with a dimension of about 370×370×3.5 mm. Three sheets were stacked with two glass mats. The stack was compression-molded for 30 minutes at a temperature of 240° C. and a pressure of about 2 MPa in a Fontijne vertical press. These conditions were sufficient to ensure full cure of the epoxy phase. The results of the properties tested of the molded and cured composite plaques are summarized in Table 6:

TABLE 6

Testing of PPE-2-BADGE-MDEA blend composite with glass mats after compression-molding

| Glass content[1] weight % | Vicat B/120[2] ° C. | Charpy unn.[2] kJ/m2 | Tensile testing[2] | | Flexural testing[2] | |
|---|---|---|---|---|---|---|
| | | | Modulus (GPa) | Strength (MPa) | Modulus (GPa) | Strength (MPa) |
| 24 | 219 | 37 | 4.9 | 83 | 3.9 | 114 |

[1]measured by the ash rest method
[2]Vicat B temperatures were measured according to ISO 306
Unnotched Charpy impact resistance was measured at room temperature according to ISO 179
Flexural modulus and Flexural strength were measured according to ISO 178
Tensile modulus and Tensile strength were measured according to ISO 527

Preblend B was fed in the feed-throat of the ZSK-30 twin screw extruder at a feed rate of about 9.6 kg per hour, and preblend C, containing the curing agent MDEA, catalyst 2-PHIM and PPE-2, was admixed downstream with molten preblend B by feeding it at barrel 8 at a feed rate of about 3.9 kg per hour using a side-feeder. Compounding was accomplished with the following experimental conditions:

barrel temperature profile: 140° C., 4×160° C., 4×150° C.,
die head: 150° C.
screw speed: 300 RPM.

The extrudate melt, upon exiting from the strand die, is cooled in a water bath and pelletized. The pellets showed one single Tg of 79° C., demonstrating that no phase separation has occurred.

Example 6

A Werner-Pfleiderer 30 mm twin screw co-rotating intermeshing 10-barrel extruder with the same screw design as used in example 3 was used. Sheet extrusion was carried out using a 8 inch sheet die with an adjustable gap between lips for variable film thickness. Preblend A was fed upstream at the throat feed with a rate of about 12.1 kg per hour, curing agent MDEA was added in downstream barrel 8 using a side-feeder for an overall rate of about 13.6 kg per hour. Compounding of curing agent MDEA with PPE-2 resin and BADGE resin was accomplished with the following experimental conditions:

barrel temperature: 220° C., 8×230° C.,
die head temperature: 230° C.,
screw speed: 175 RPM.

These results show that excellent properties are obtained with the process of this invention.

Example 7

A Werner-Pfleiderer ZSK-30 twin screw extruder and a modified Killion rolls set with oil heating capability, as very schematically shown in FIG. 3, were employed to PPE-2/BADGE/MDEA blends with a glass mat. Preblend A fed in the feed-throat (1) of the ZSK-30 twin screw extruder at a feed rate of about 12.1 kg per hour, and curing agent MDEA was admixed downstream with molten preblend in barrel 8 at a feed rate of about 1.5 kg per hour using a side-feeder (2). Compounding was accomplished with the following experimental conditions:

barrel temperature profile: 150° C., 8×220° C.,
sheet die: 230° C.,
screw speed: 300 RPM.

The extrudate melt, upon exiting from the sheet die, meets with one glass mat, and is forced to impregnate and consolidate with the mat by the nip rolls (4). In the experiments, two pairs of nip rolls were used. The first pair of nip rolls, which was heated by hot oil to about 140–170° C., facilitated the consolidation of the molten blend with the glass mat, while the second pair, room temperature rolls cooled down the consolidated prepegs. The glass mat, which was mounted in the Killion rolls set by a pair of magnetic bases, was preheated to about 140° C. by a hot air gun to facilitate the glass mat impregnation with the melt FIG. 3 shows an alternative design with which it is possible to combine two glass mats with the extrudate melt wherein the glass mats are fed over two rollers (3). Excellent prepeg mechanical integrity, good glass impregnation, and smooth surface appearance were achieved. The prepared prepregs can be molded and cured into articles of desired dimensions.

What is claimed is:

1. A process for preparing a polymer composition comprising:
(a) melt mixing at least one thermoplastic polymer at a temperature above the glass transition temperature or above the melting temperature of the thermoplastic polymer with one of (i) an uncured epoxy resin, or (ii) an epoxy curing agent or a catalyst to form a blend;
(b) further melt mixing at a temperature above the glass transition temperature or above the melting temperature of the thermoplastic polymer the other of (i) an epoxy resin, or (ii) a epoxy curing agent or a catalyst, with the blend in (a) to form a substantially uncured but essentially curable composition, polymerizable composition, or curable and polymerizable composition;
(c) optionally forming a shaped product from the composition in (b); and
(d) fast curing and/or fast polymerizing the optionally formed shaped product;
wherein the relative quantities of the at least one thermoplastic polymer, the uncured epoxy resin, and the epoxy curing agent or catalyst are chosen such that after step (d) at least one thermoplastic polymer forms a continuous phase; and
wherein the thermoplastic polymer and the one of an uncured epoxy resin or an epoxy curing agent blend is formed in the upstream part of a melt extruder, and the mixing of the other of an epoxy resin or an epoxy curing agent with the blend occurs in the downstream part of the extruder forming the substantially uncured but curable composition, polymerizable composition, or curable and polymerizable composition.

2. The process of claim 1, wherein the substantially uncured but essentially curable composition, polymerizable composition, or curable and polymerizable composition is extruded to form a powder, granulate, film, or sheet.

3. The process of claim 1, wherein a combination of an epoxy resin and an epoxy curing agent or catalyst is used which shows phase separation within two minutes at the temperature used for the melt mixing in step (b) as evidenced by an increase in the viscosity.

4. The process of claim 1, wherein the curing of step (d) is performed within sixty minutes.

5. A prepreg formed by the process of claim 1.

6. A process for preparing a polymer composition comprising:
(a) melt mixing at least one thermoplastic polymer at a temperature above the glass transition temperature or above the melting temperature of the thermoplastic polymer with one of (i) an uncured epoxy resin, or (ii) an epoxy curing agent or a catalyst to form a blend;
(b) further melt mixing at a temperature above the glass transition temperature or above the melting temperature of the thermoplastic polymer the other of (i) an epoxy resin, or (ii) a epoxy curing agent or a catalyst, with the blend in (a) to form a substantially uncured but essentially curable composition, polymerizable composition, or curable and polymerizable composition;
(c) optionally forming a shaped product from the composition in (b); and
(d) fast curing and/or fast polymerizing the optionally formed shaped product;
wherein the relative quantities of the at least one thermoplastic polymer, the uncured epoxy resin, and the epoxy curing agent or catalyst are chosen such that after step (d) at least one thermoplastic polymer forms a continuous phase, and
wherein at least one of a static or dynamic mixer is used to form the substantially uncured but essentially curable composition, polymerizable composition, or curable and polymerizable composition by mixing the other of an epoxy resin or a epoxy curing agent with the blend.

7. The process of claim 6, wherein a combination of an epoxy resin and an epoxy curing agent or catalyst is used which shows phase separation within two minutes at the temperature used for the melt mixing in step (b) as evidenced by an increase in the viscosity.

8. The process of claim 6, wherein the curing of step (d) is performed within sixty minutes.

9. A prepreg formed by the process of claim 6.

10. A process for preparing a polymer composition comprising:
(a) melt mixing at least one thermoplastic polymer at a temperature above the glass transition temperature or above the melting temperature of the thermoplastic polymer with one of (i) an uncured epoxy resin, or (ii) an epoxy curing agent or a catalyst to form a blend;
(b) further melt mixing at a temperature above the glass transition temperature or above the melting temperature of the thermoplastic polymer the other of (i) an epoxy resin, or (ii) a epoxy curing agent or a catalyst, with the blend in (a) to form a substantially uncured but essentially curable composition, polymerizable composition, or curable and polymerizable composition;
(c) optionally forming a shaped product from the composition in (b); and
(d) fast curing and/or fast polymerizing the optionally formed shaped product;
wherein the relative quantities of the at least one thermoplastic polymer, the uncured epoxy resin, and the epoxy curing agent or catalyst are chosen such that after step (d) at least one thermoplastic polymer forms a continuous phase; and
wherein the epoxy resin is at least partially cross linked after fast curing or fast polymerizing.

11. The process of claim 10, wherein a combination of an epoxy resin and an epoxy curing agent or catalyst is used which shows phase separation within two minutes at the temperature used for the melt mixing in step (b) as evidenced by an increase in the viscosity.

12. The process of claim 10, wherein the curing of step (d) is performed within sixty minutes.

13. A prepreg formed by the process of claim 10.

14. A process for preparing a polymer composition comprising:
(a) melt mixing at least one thermoplastic polymer at a temperature above the glass transition temperature or above the melting temperature of the thermoplastic polymer with one of (i) an uncured epoxy resin, or (ii) an epoxy curing agent or a catalyst to form a blend:
(b) further melt mixing at a temperature above the glass transition temperature or above the melting temperature of the thermoplastic polymer the other of (i) an epoxy resin, or (ii) a epoxy curing agent or a catalyst with the blend in (a) to form a substantially uncured but essentially curable composition, polymerizable composition, or curable and polymerizable composition;

(c) optionally forming a shaped product from the composition in (b); and (d) fast curing and/or fast polymerizing the optionally formed shaped product;

wherein the relative quantities of the at least one thermoplastic polymer, the uncured epoxy resin, and the epoxy curing agent or catalyst are chosen such that after step (d) at least one thermoplastic polymer forms a continuous phase; and wherein the uncured epoxy resin has a molecular weight of less than about 3,000.

15. The process of claim 14, wherein a combination of an epoxy resin and an epoxy curing agent or catalyst is used which shows phase separation within two minutes at the temperature used for the melt mixing in step (b) as evidenced by an increase in the viscosity.

16. The process of claim 14, wherein the curing of step (d) is performed within sixty minutes.

17. A prepreg formed by the process of claim 14.

18. A process for preparing a polymer composition comprising:

(a) melt mixing at least one thermoplastic polymer at a temperature above the glass transition temperature or above the melting temperature of the thermoplastic polymer with one of (i) an uncured epoxy resin or (ii) an epoxy curing agent or a catalyst to form a blend;

(b) further melt mixing at a temperature above the glass transition temperature or above the melting temperature of the thermoplastic polymer the other of (i) an epoxy resin, or (ii) a epoxy curing agent or a catalyst with the blend in (a) to form a substantially uncured but essentially curable composition polymerizable composition, or curable and polymerizable composition;

(c) optionally forming a shaped product from the composition in (b); and (d) fast curing and/or fast polymerizing the optionally formed shaped product;

wherein the relative quantities of the at least one thermoplastic polymer, the uncured epoxy resin, and the epoxy curing agent or catalyst are chosen such that after step (d) at least one thermoplastic polymer forms a continuous phase; and wherein the thermoplastic polymer comprises at least one of a polyphenylene ether, polyetherimide, polyester, aliphatic polyketone, or syndiotactic polystyrene.

19. The process of claim 18, wherein a combination of an epoxy resin and an epoxy curing agent or catalyst is used which shows phase separation within two minutes at the temperature used for the melt mixing in step (b) as evidenced by an increase in the viscosity.

20. The process of claim 18, wherein the curing of step (d) is performed within sixty minutes.

21. A prepreg formed by the process of claim 18.

* * * * *